Jan. 9, 1934.    D. D. PEEBLES ET AL    1,942,830
FISH COOKING APPARATUS
Filed Sept. 25, 1931    11 Sheets-Sheet 3
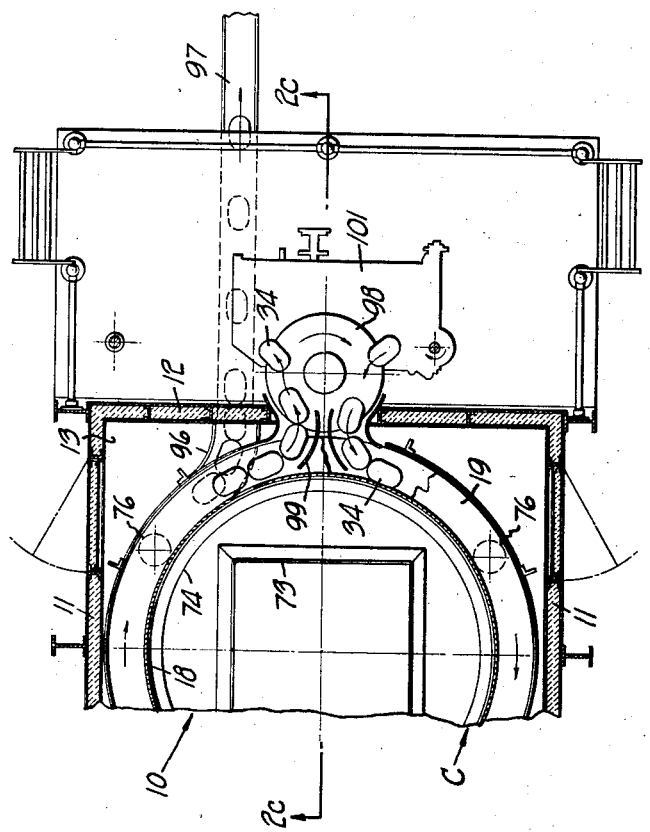
INVENTORS
David D. Peebles
Paul D.V. Manning
BY Alfred H. Potbury
White, Prost, Fisher & Lothrop
ATTORNEYS.

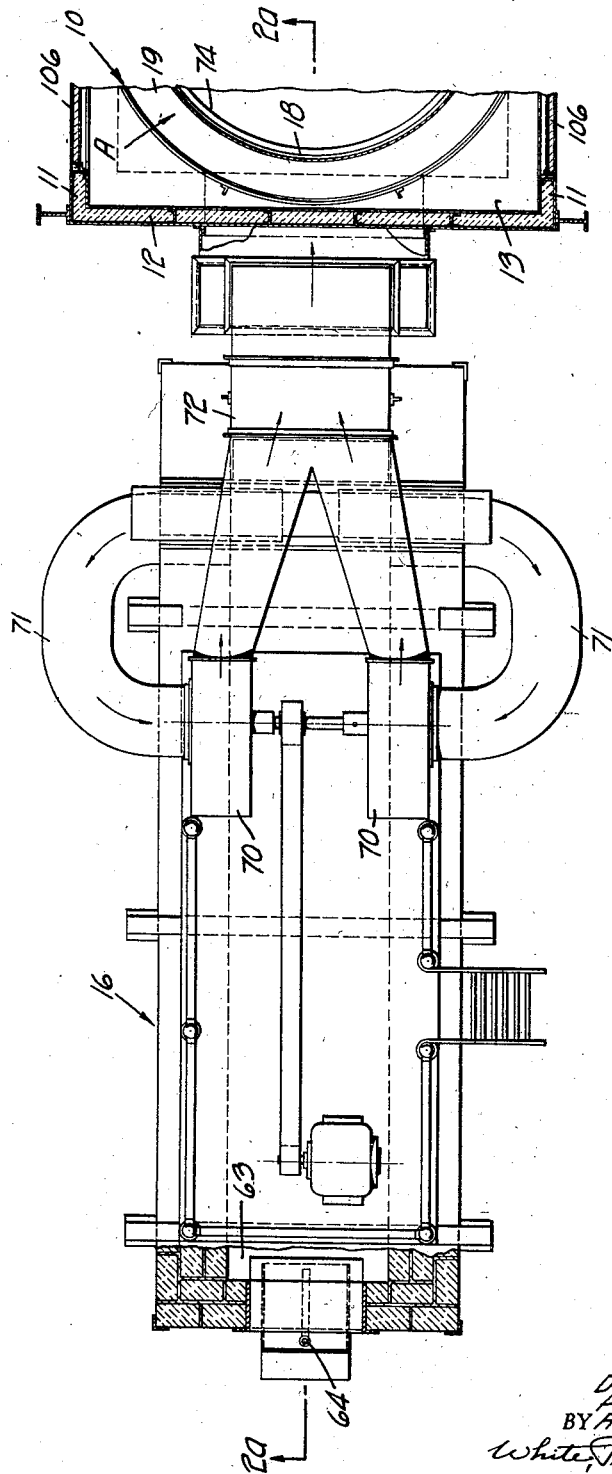

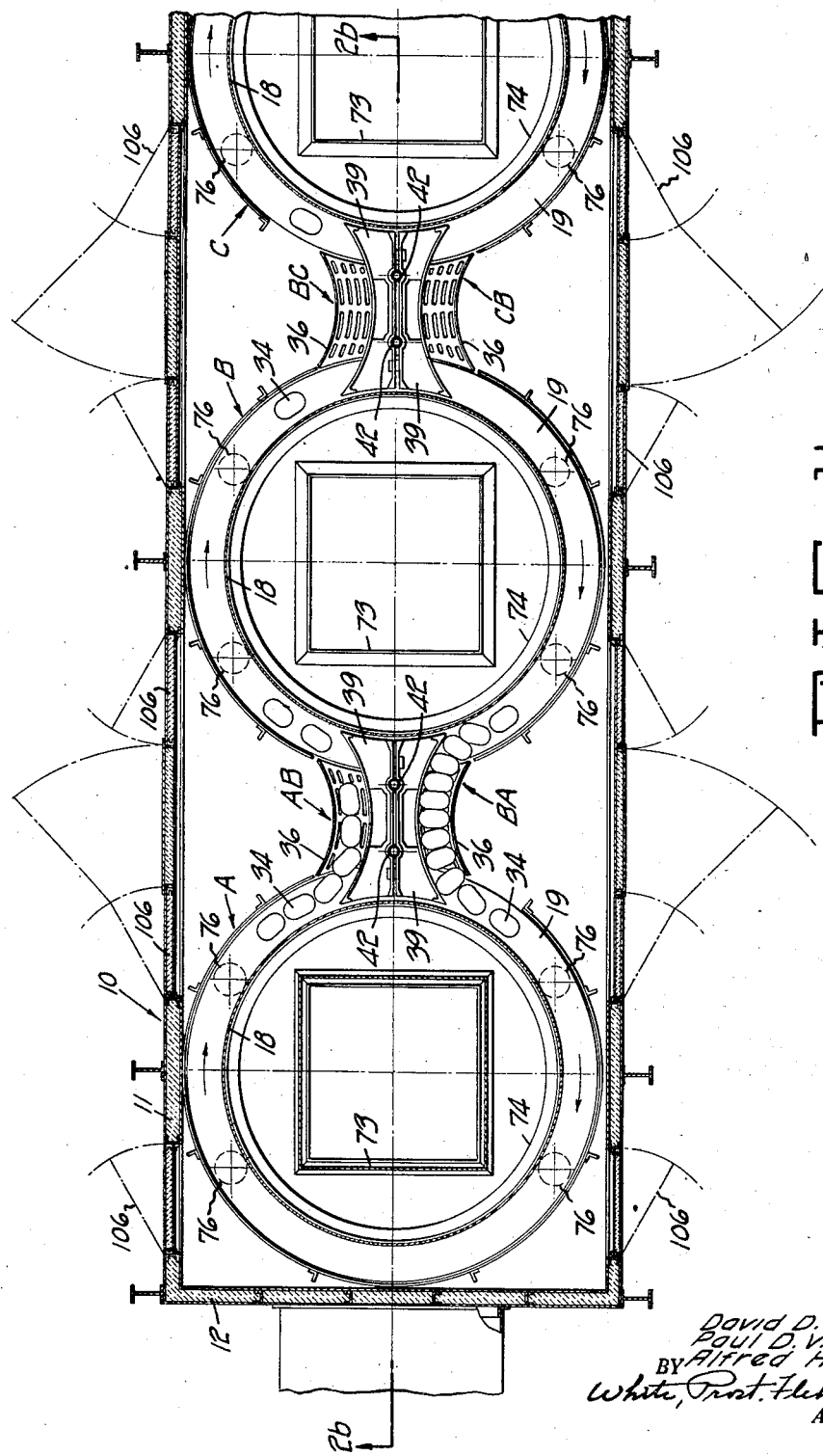

Jan. 9, 1934.                D. D. PEEBLES ET AL                 1,942,830
                             FISH COOKING APPARATUS
                              Filed Sept. 25, 1931          11 Sheets-Sheet 4
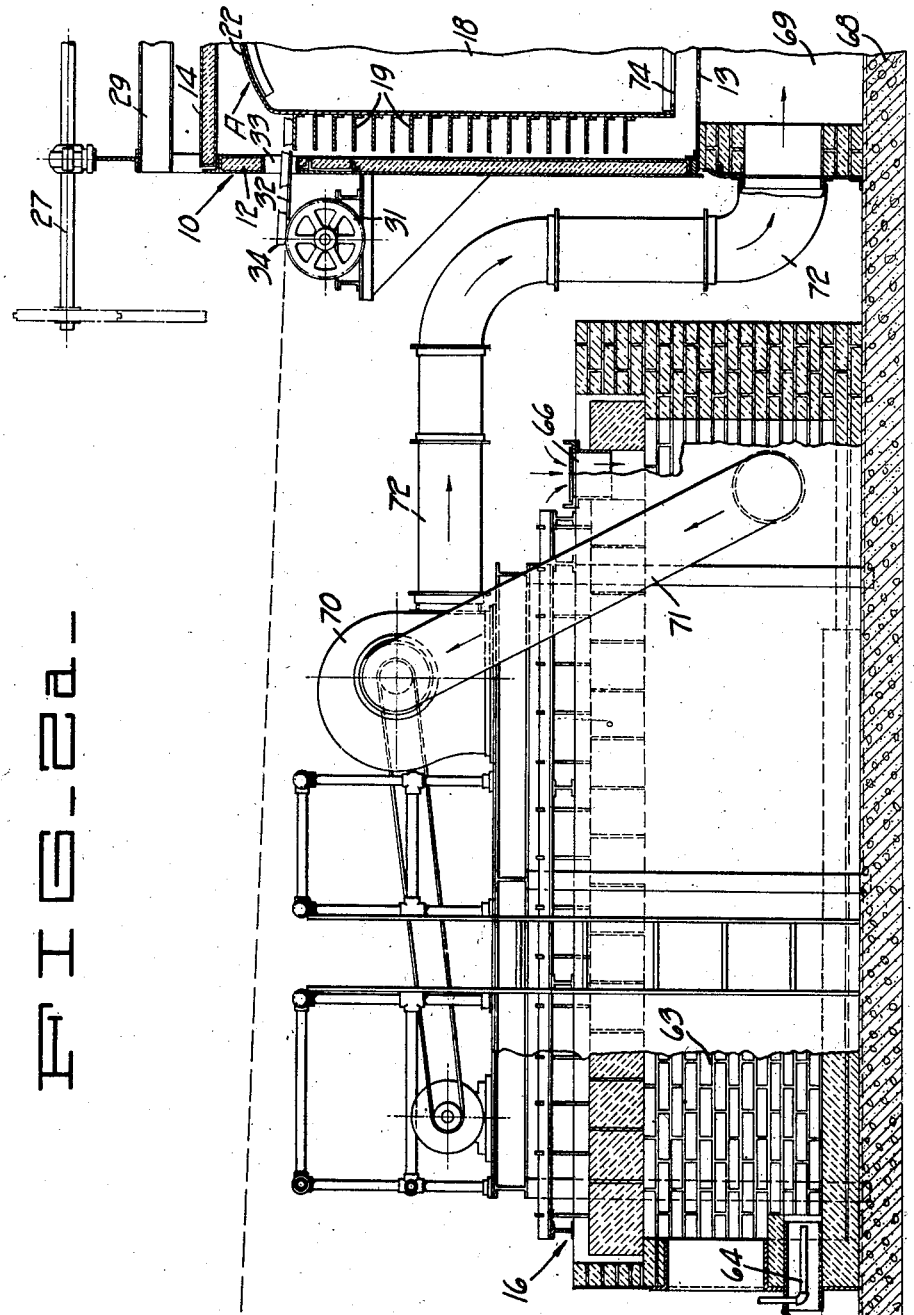
INVENTORS
David D. Peebles
Paul O. V. Manning
BY Alfred H. Potbury
White, Prost, Feble & Lothrop
ATTORNEYS.

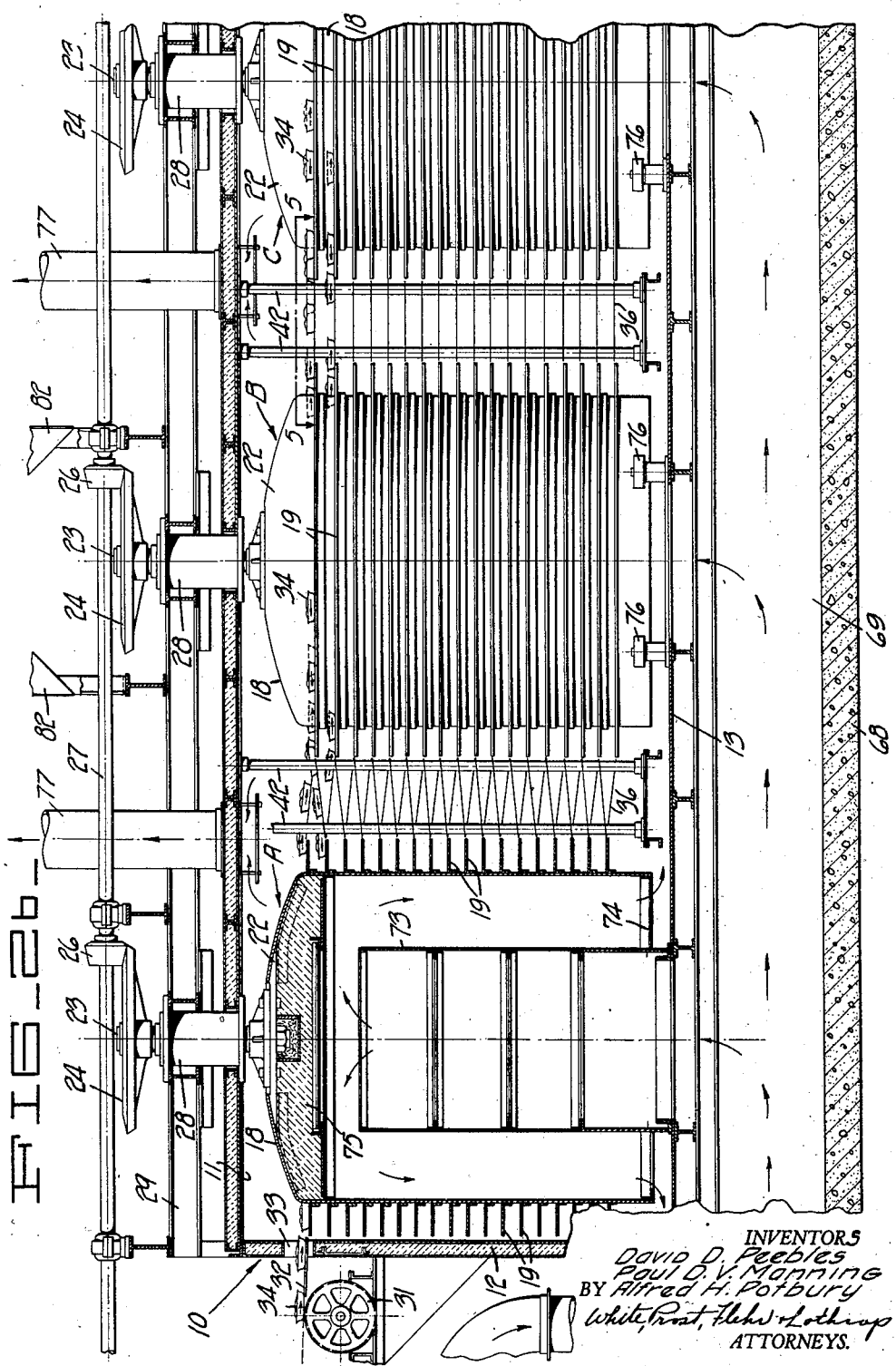

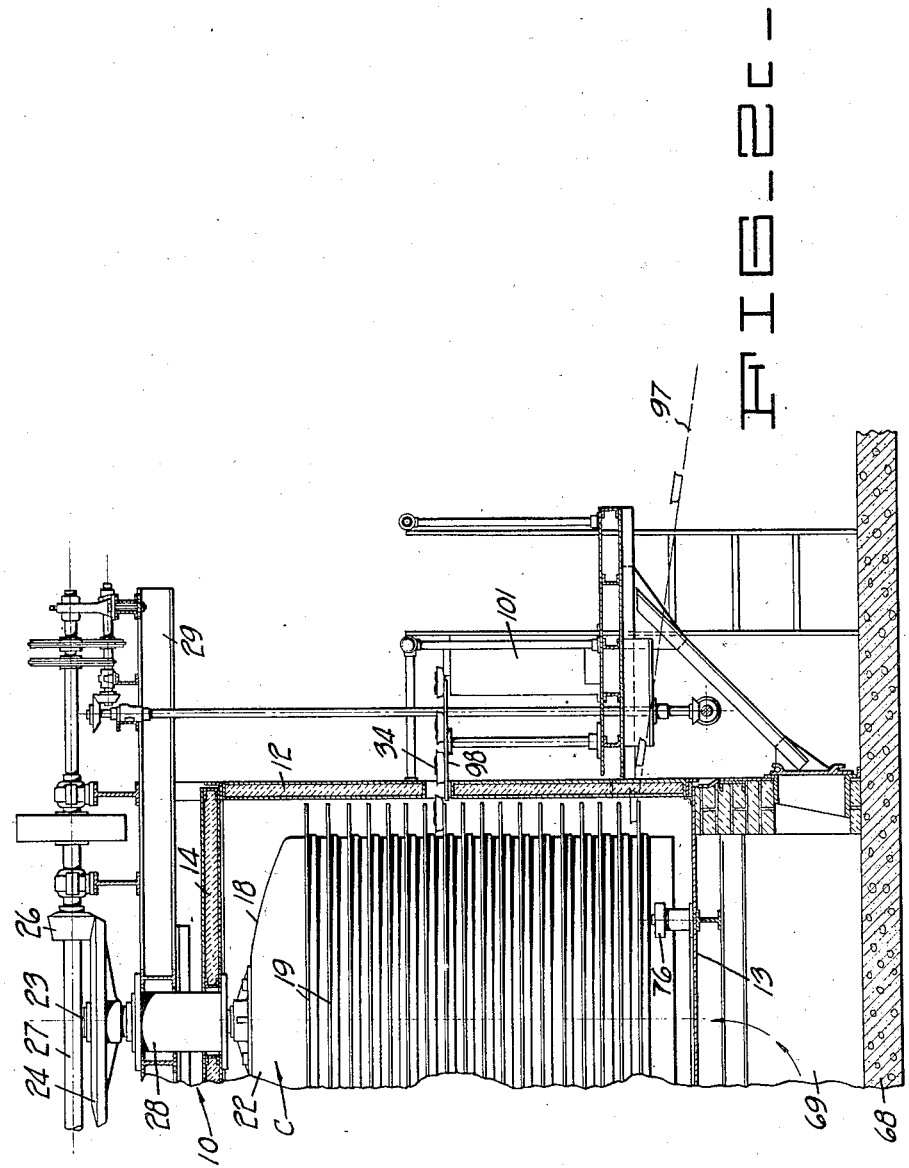

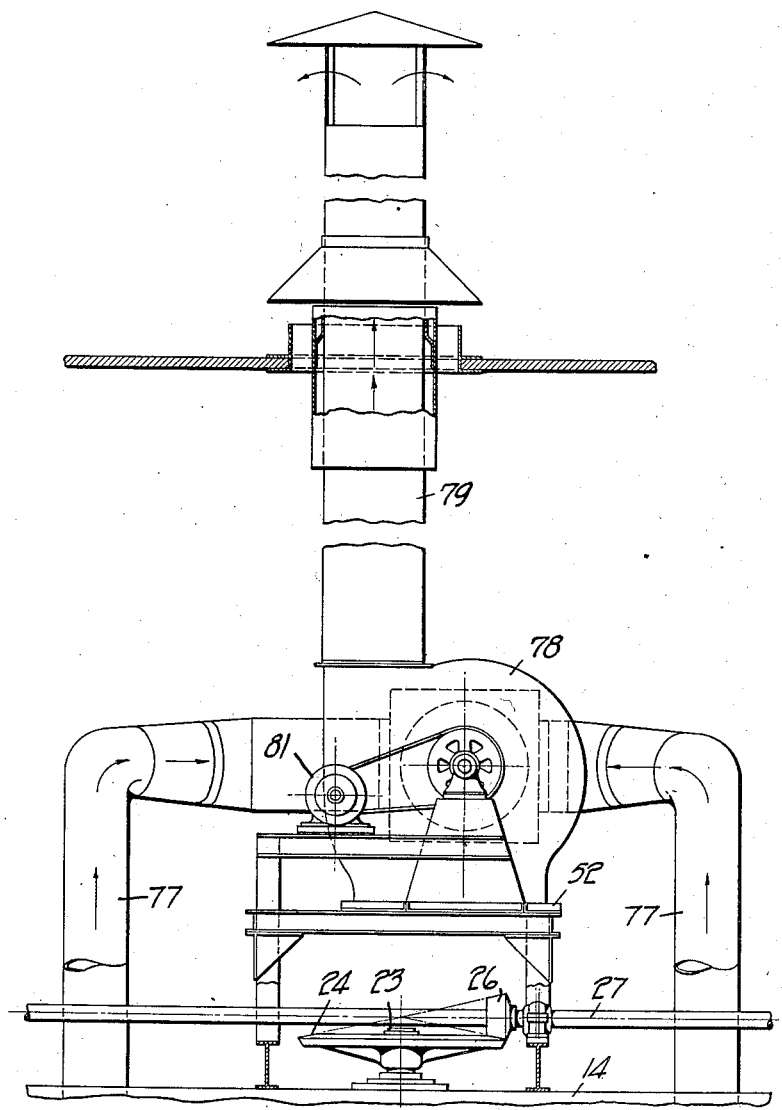

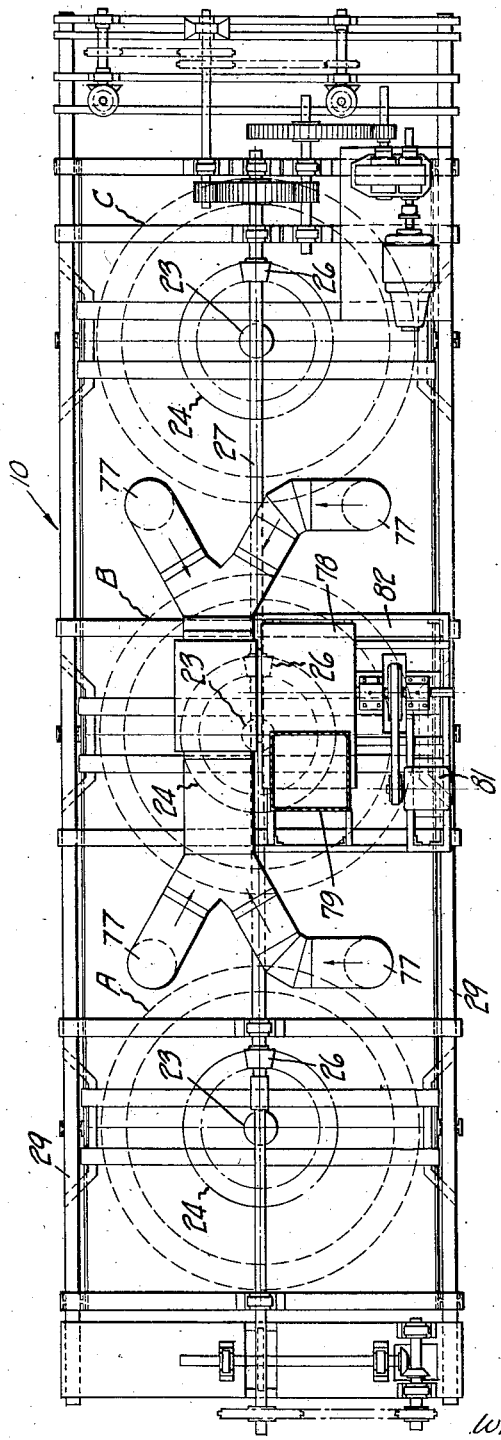

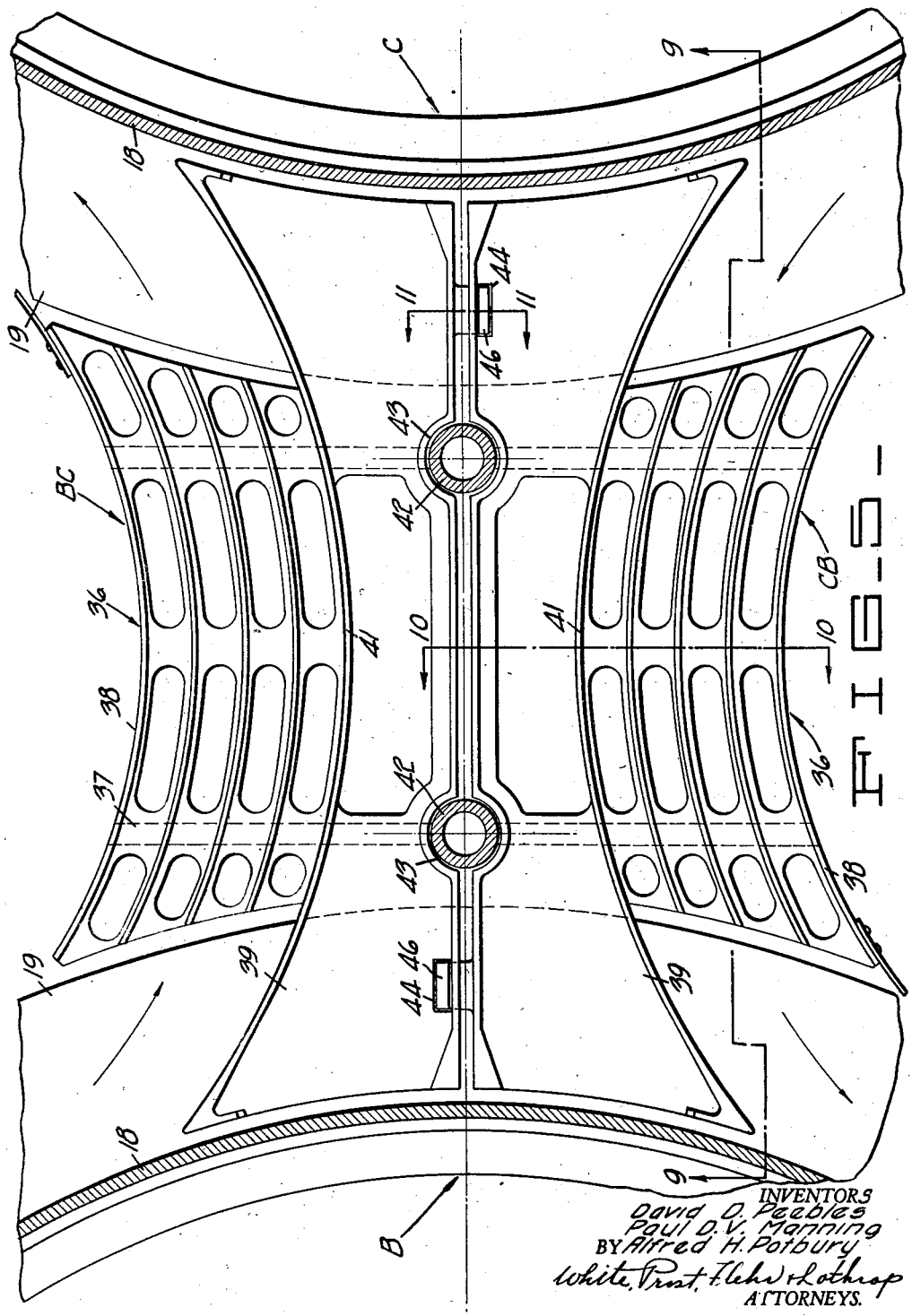

Jan. 9, 1934.  D. D. PEEBLES ET AL  1,942,830
FISH COOKING APPARATUS
Filed Sept. 25, 1931   11 Sheets-Sheet 10
FIG_6_
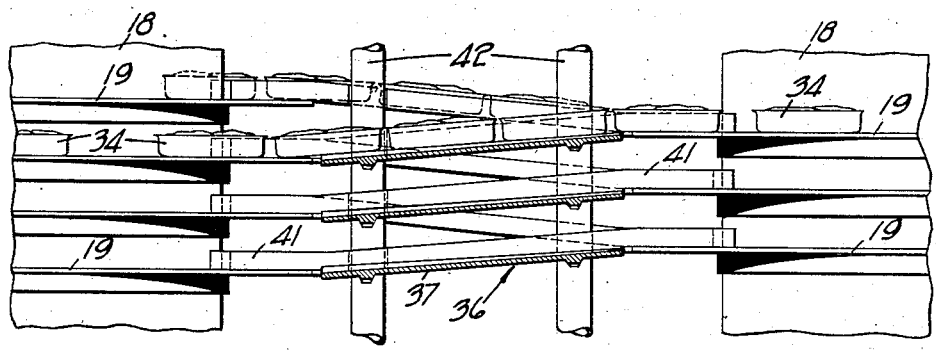
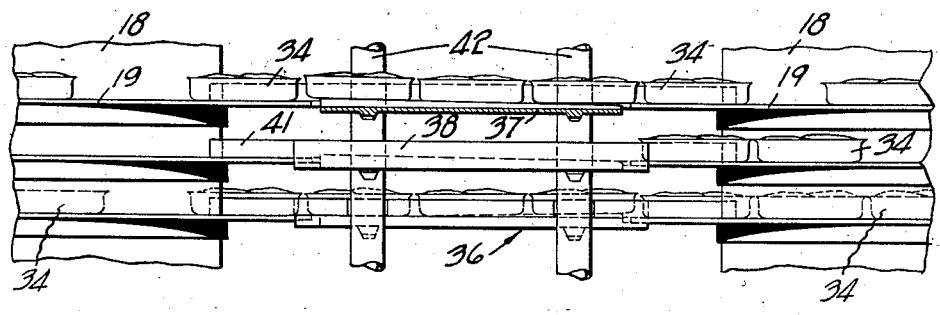
FIG_7_
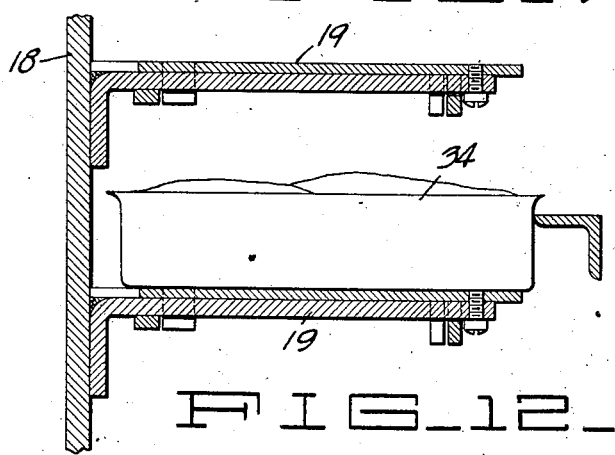
FIG_12_
INVENTORS
David D. Peebles
Paul D. V. Manning
BY Alfred H. Potbury
White, Prost, Hebs+Lothrop
ATTORNEYS.

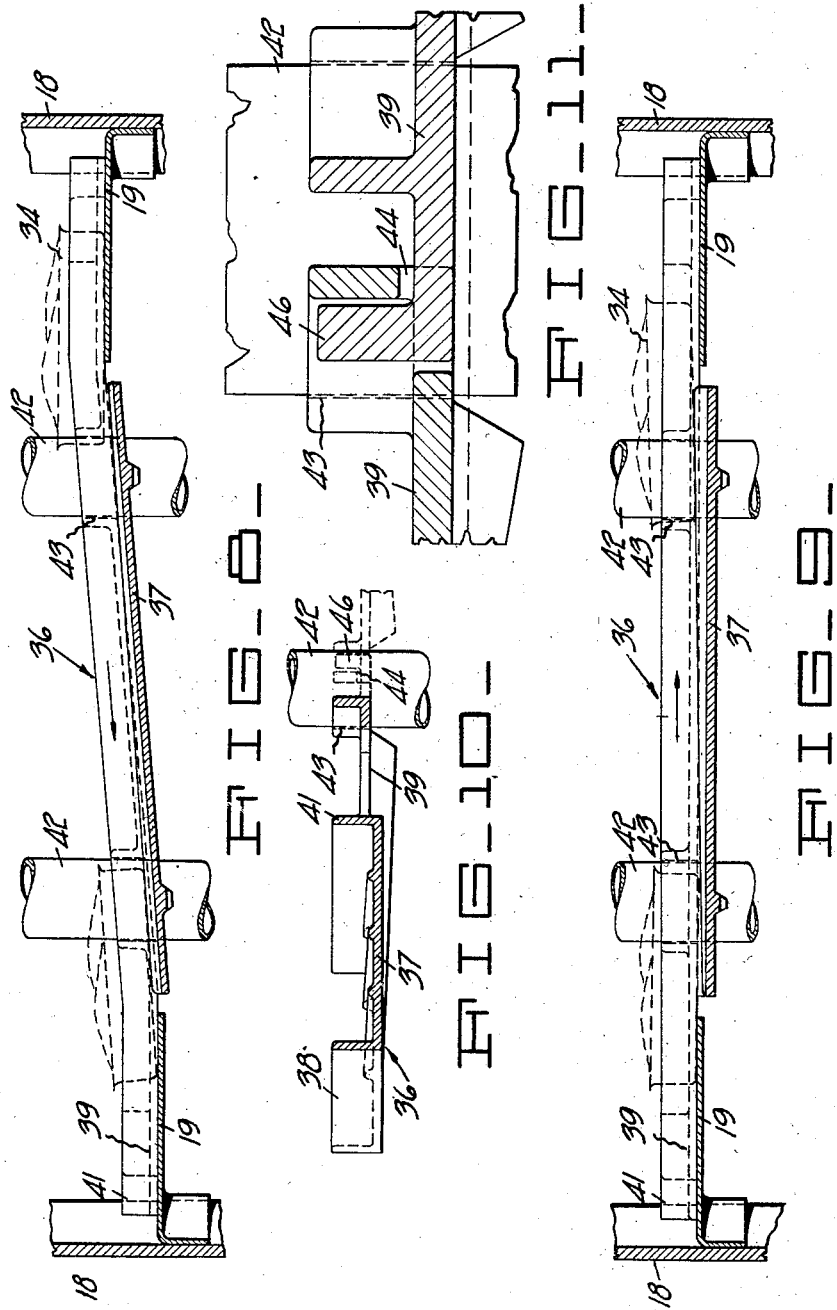

Patented Jan. 9, 1934

1,942,830

UNITED STATES PATENT OFFICE 1,942,830

FISH COOKING APPARATUS

David D. Peebles, Eureka, Paul D. V. Manning, Berkeley Woods, and Alfred H. Potbury, Berkeley, Calif.

Application September 25, 1931
Serial No. 565,010

11 Claims. (Cl. 99—2)

This invention relates generally to apparatus for effecting cooking operations, particularly the cooking of fish in canneries.

It is a general object of the invention to devise a fish cooking apparatus capable of securing a finished product which is relatively palatable and digestible, and which will have the skin of the fish substantially intact.

It is a further object of the invention to devise an improved cooking apparatus which will have a relatively high capacity for a given amount of space occupied.

It is a further object of the invention to devise an improved fish cooking apparatus which is automatic in its operation, and which will serve to store fish in a cooking chamber for a predetermined cooking period.

It is a further object of the invention to devise a cooking apparatus making possible a grilled or broiled canned fish product.

It is another object of the invention to devise an improved fish cooking apparatus capable of economic operation, which will require a minimum amount of labor for its operation, and which will not readily become jammed or inoperative when in use.

It is another object of the invention to generally improve upon fish cooking apparatus such as disclosed in our copending application No. 473,178, filed August 5, 1930, particularly with respect to securing better control of the atmosphere with which the fish are subjected during a cooking operation, and with respect to means for effecting transfer of the cans of fish from different supporting shelves.

Further objects of the invention will appear from the following description in which the preferred embodiment of the invention has been set forth in detail in conjunction with the accompanying drawings. It is to be understood that the appended claims are to be accorded a range of equivalents consistent with the state of the prior art.

Referring to the drawings:

Figs. 1a, 1b and 1c taken together illustrate in cross sectional plan, a machine incorporating principles of the present invention.

Figs. 2a, 2b and 2c taken together, form a cross sectional side elevational detail of the apparatus illustrated in Figs. 1a, 1b and 1c. Figs. 2a, 2b and 2c are taken respectively along the lines 2a—2a, 2b—2b, and 2c—2c of Figs. 1a, 1b and 1c respectively.

Fig. 3 is a side elevational detail showing the blower and conduit connections to the same for exhausting gas from the cooking chamber.

Fig. 4 is a plan view on a reduced scale illustrating the structure forming the cooking chamber and the driving mechanism mounted upon the top thereof.

Fig. 5 is an enlarged cross sectional detail taken along the line 5—5 of Fig. 2b.

Fig. 6 is an enlarged detail, partly in cross section, showing the arrangement of the elements of transfer means AB and BA.

Fig. 7 is an enlarged cross sectional detail similar to Fig. 6, but of transfer means BC and CB.

Fig. 8 is an enlarged cross sectional detail similar to Fig. 6 but omitting all but one of the transfer structures.

Fig. 9 is an enlarged cross sectional detail taken along the lines 9—9 of Fig. 5.

Fig. 10 is an enlarged cross sectional detail taken along the line 10—10 of Fig. 5.

Fig. 11 is a cross sectional detail taken along the line 11—11 of Fig. 5.

Fig. 12 is an enlarged cross sectional detail illustrating the construction of the shelves upon the drums of the cooker.

The apparatus herein described is designed particularly for use in canneries for the treatment of small fish, commonly termed "sardines", whereby valuable fish oil is recovered and the flesh of the fish is cooked to produce an edible product. Within the cooking chamber of the apparatus to which cans containing the fish can be continuously delivered, the cans are stored for a predetermined cooking period, and are then discharged to suitable machinery for applying and sealing the lids to the cans. At some suitable point or points in the process, oil rendered from the fish is drained from the cans.

Referring to Figs. 1a, 1b and 1c, and also Figs. 2a, 2b and 2c of the drawings, the chamber in which the cooking of the fish takes place is formed by a suitable structure 10. This structure includes side walls 11, end walls 12, bottom wall 13 and top wall 14. It is evident that these walls may be formed in any suitable manner. For example as indicated the side, ends and top walls can be made of suitable structural members carrying spaced metal plates, the plates being separated by heat insulating material. As a means for supplying heat to structure 10, we provide a suitable furnace indicated generally at 16, which will be presently described in detail.

The means which we utilize within structure 10 to handle and store canned fish during a cooking period, has been designed to provide relatively high capacity for a given amount of space and in order to subject the fish to a novel cooking method. The preferred manner of accomplishing these results is to utilize an arrangement of shelving within structure 10 which is adapted to receive and support a relatively large quantity of cans, and the cans upon the shelving are continually moved thru a predetermined non-linear path, until the end of the cooking period. This shelving is preferably incorporated in a plurality of units identified as A, B and C. Each unit consists of a drum 18 made of suitable material such as sheet metal, having a plurality of spaced superposed shelves 19 mounted upon the periphery of the same. The shelves extend circumferentially about the drums as shown in Fig. 1b, and are made of material having good heat conductivity, such as metal.

As shown in Fig. 2b units A, B and C are mounted to rotate about spaced vertical axes. Thus each drum 18 is provided with an upper end wall or head 22, to which an upright concentric shaft 23 is secured. Shafts 23 extend upwardly thru the upper wall 14, and are operatively connected to suitable drive means, such as represented by beveled gears 24 and 26 driven by a counter shaft 27. It is evident that with this drive connection, rotation of counter shaft 27 drives the units A, B and C in synchronism. Shaft 23 serves to carry the weight of their respective rotatable units and they are therefore shown associated with suitable journals 28, these journals being supported by structure 29 overlying the upper wall 14. Journals 28 are preferably water cooled so as not to be detrimentally affected by heat.

In order to supply cans containing fish to the shelves 19, so that the apparatus can operate automatically, we have indicated conventional means such as an endless conveyor, one end of which is carried by sprocket 31, (Fig. 2a). A small chute 32 serves to deliver cans from the end of this conveyor to the uppermost shelf of unit A, thru an opening 33. As will be presently explained, when in operation open cans 34 within which fish is packed, are delivered thru opening 33 and are disposed one behind the other upon the uppermost shelf 19 of unit A as shown in Fig. 2b.

In order to utilize the available storage space provided by shelves 19 of the different units A, B and C, and in order to extend the cooking period and make it continuous, we provide transfer means which serve to transfer cans 34 between the different units A, B and C, and which serve to transfer the cans to the different shelves of each unit. As shown in Figs. 1b and 2b, it is desirable to divide the transfer means into a plurality of units or groups, these units in the present instance being identified as AB, BC, CB and BA. Unit AB serves to transfer cans between the rotatable units A and B, unit BC transfers from unit B to unit C, unit CB transfers from C to B, while unit BA transfers from B back to the original unit A. The particular transfer means shown constitutes an improvement over the means illustrated in said copending application Ser. No. 473,178.

Referring to Fig. 5, each of the units BC and CB consists of a plurality of superposed metal structures 36, which can be formed as castings. Each casting affords a curved trackway or slide 37 for passage of cans, which is bounded on its outer edge by a curve upstanding flange 38. Each structure 36 is also formed to provide end webs or plates 39 which are adapted to overlie and rest upon corresponding shelves 19 of the units A and B with which the particular can slide cooperates. An upstanding flange 41 extends along the inner edge of trackway 37, also extends to the ends of plates 39. In order to retain structures 36 in one general position, and at the same time permit individual adjusting movement thereof, each structure is also loosely retained by the spaced upright columns 42. These columns 42 are arranged along the line of centers between the units A and B and have their upper and lower ends fixed to the general structure 10. The inner edges of structures 36 have arcuate recesses or pockets 43 whereby they partially embrace columns 42. Adjacent structures 36 of the two transfer means BC and CB are also loosely linked together by means such as shown in Figs. 5 and 11. Thus the inner edge of each structure 36 is provided with an opening 44, and also with a projecting L-shaped lug 46. Each L-shaped lug 46 of one structure 36 loosely engages thru the aperture 44 of a corresponding adjacent structure 36, whereby the corresponding structures 36 of the two transfer means BC and CB are loosely interlocked together.

It will be noted that the shelves of unit B are staggered with respect to the shelves of unit A, while the shelves of units B and C are at substantially the same level. Therefore the trackway slides 37 for transfer means BC and CB are substantially level as shown in Fig. 9, while the trackway slides 37 for transfer means AB and BA are oppositely inclined, as shown in Figs. 6 and 8. Accordingly for the structures 36 of transfer means BC and CB, the interlock connection illustrated in detail in Fig. 11 provides two points of connection between structures 36 on the same level. However in the case of transfer means AB and BA, the interlock connection is serially between structures 36 as indicated in Fig. 6, that is one structure 36 for one transfer means, say transfer means AB, has one interlock connection with a structure 36 of transfer means BA which is inclined downwardly, and another interlock connection with another structure 36 of transfer means BA which is inclined upwardly.

To clarify the apparatus thus far described, it may be explained at this time that the path of the cans moving over units A, B and C is as follows: As the cans are received one after the other upon the uppermost shelf of unit A, they are carried about one side of the axis of this unit, as indicated by the arrows in Fig. 1b until they reach the transfer unit AB. They are then pushed across the can slide 37 of the uppermost structure 36 of this unit, and are delivered to the uppermost shelf of unit B. After being carried about one side of the axis of unit B, the cans are slid over the uppermost can slide 37 of transfer unit BC to the uppermost shelf of unit C. After moving substantially about the axis of unit C, the cans are slid over the uppermost can slide 37 of transfer unit CB back to the uppermost shelf of unit B, and upon this shelf they are moved about the axis of unit B to the uppermost can slide 37 of transfer unit BA. Transfer unit BA serves to discharge the cans to the second shelf of unit A. The cans delivered to the second shelf of unit A move substantially entirely about the axis of unit A until they are delivered to the second can slide 37 of transfer unit AB. From this second can slide, the path of the cans can be traced along the second shelf of unit B, the second can slide of transfer unit BC, the second shelf of unit C, the second can slide of transfer unit CB, the second shelf of unit B, to the second can slide of transfer unit BA, which then delivers the cans to the third self of unit A. Therefore a given can travels from one shelf of unit A to unit C and then back again to the next lower shelf of unit A. Within a given time period it is apparent that a can entering the cooking chamber upon uppermost shelf of unit A, will reach the lowermost shelf of unit C, and it is from this lowermost shelf that the can is preferably finally discharged from the cooking chamber. Likewise assuming that the cans are delivered to the uppermost shelf of unit A in close succession, in time all of the shelves of units A, B and C will contain cans, and therefore cans can be continually removed from the lowermost shelf of unit C. Movement of cans across the can slides 37 is effected by pushing the cans in close succession as indicated in Fig. 1b. In this connection note that the distance between curved flanges 38 and 41, should be sufficient to accommodate the cans in any position, that is this distance should be at least slightly greater than the length of the cans.

In our above mentioned application Ser. No. 473,178 the transfer units were made up of a plurality of rotating transfer discs. It was necessary to rotate these discs at a proper speed with respect to the speed of rotation of the units A, B and C, and the discs of each unit were mounted upon a rotatable shaft. While such an arrangement was workable, the present improved structure has been found more satisfactory. With the present construction each can slide is free to properly aline itself with the shelf from which cans are received and the shelf to which the cans are delivered. Therefore, unequal expansion of certain parts of the apparatus, or imperfections in the positioning of the shelves in units A, B and C, will not result in improper operation. Another advantage is that the can slides can be separately removed for repair or replacement. In operating cooking apparatus utilizing the present improved construction, a marked decrease in the number of shutdowns caused by jamming of the cans has been noted.

From the above it is apparent that the shelves 19 serve the function of supporting and carrying the cans through a nonlinear and circuitous path through the interior of structure 10 whereby a large number of cans are stored within the apparatus during a cooking period. These shelves also serve the useful function of effecting transfer of heat to the fish within the can, as will be presently described, and to enable them to perform this function they are heated to such a degree that a substantial amount of heat dissipated from the same is in the form of heat of radiation. In order to impart heat to shelves 19, we prefer to pass the hot gas through each drum 18, this gas being produced by the furnace 16. While the construction of the furnace may vary, the particular form shown in Fig. 2a, consists of a combustion chamber 63 formed by suitable refractory walls. Suitable means such as a natural gas burner 64 supplies a combustible mixture to the combustion chamber. A refractory structure 68 extends beneath units A, B and C, and forms a passageway 69 communicating with combustion chamber 63, and through which hot gaseous products of combustion are caused to flow. Hot gases of combustion from chamber 63 are introduced into passageway 69 by means of two blowers 70, these blowers having their intakes connected to the combustion chamber of the furnace by the two conduits 71, and their outlets connected to passageway 69 by conduit 72. Air from the atmosphere flows in through openings 66 and serves to dilute and lower the temperature of the products of combustion introduced into the cooking chamber, to the desired level, thus enabling high combustion efficiency and a lower temperature of resulting gases. Air introduced at this point also has an effect upon the humidity of the resulting diluted gases.

Extending upwardly within each drum 18 and concentrically with respect to the axis of the same, there is a conduit 73, this conduit having an upper open end and having its lower end fixed to bottom wall 13. The lower end of each drum 18 is open and is spaced from the bottom wall 13, thereby forming an annular passage 74 for flow of gas from the drums to the space surrounding the same. Thus, hot gas flows from passageway 69, upwardly through each conduit 73, then downwardly between this conduit and the inner wall of drum 18, and into the space surrounding the drums through passageway 74. In order to avoid undue heating of the top walls 22 of the drums, which would result in a heat wastage, the inner surfaces of walls 22 are covered with heat insulating material 75.

Because the drums 18 are supported entirely by the upper shafts 23, it is desirable to provide means for guiding and steadying the lower portion of the drums. For this purpose we have shown rollers 76 mounted upon the bottom wall 13, and arranged to engage the lower edge of each drum 18 at circumferentially spaced points.

In order to effect the continual removal of gas from the space surrounding drum 18, we provide a plurality of exhaust conduits 77 which communicate through the upper wall 14. As shown in Fig. 3 these exhaust conduits 77 communicate with the intake of a blower 78, the outlet of which is connected to an exhaust conduit 79. Blower 78 can be operated by a small electric motor 81, which is preferably of variable or adjustable speed, and the motor and blower can be carried by a suitable frame 82 mounted upon the upper wall 14.

With circulation of hot gas through the drums, through the space surrounding the same and out through exhaust conduit 77, it is evident that a portion of the heat of gas passing through each conduit 73 is absorbed and the walls of the conduit are heated to such a degree as to cause a transfer of heat to the side walls of the surrounding drum 18 by radiation. Likewise the side walls of drums 18 are heated by transfer of heat from direct contact with the hot gases, as well as by heat of radiation received from conduit 73. The heating of the side walls of drums 18 causes heat to be transferred by conduction to the metal shelves 19, and the temperature at which these shelves are maintained is also sufficient to effect radiation of a substantial degree of heat as well as conduction of heat through the bottoms of cans. The gases leaving the drums and flowing into the space surrounding the same are necessarily at a relatively lower temperature than the gases in passageway 69 but are at a temperature sufficiently high to aid in the cooking operation as will be presently explained.

As has been previously mentioned, the cans at the end of a cooking operation can be conveniently removed from the bottom shelf of unit C. As representative of suitable means for effecting automatic removal of the cans, we have indicated a suitable guide chute 96 (Fig. 1c) which serves to divert the cans from the lowermost shelf of unit C and to deliver them through a suitable opening in the end wall of structure 10, from which they can be picked up by suitable conveying means 97. The cans delivered at this point are introduced into a suitable machine, which applies and seals the lids to the cans. However, before the cans are sealed, it is preferable to drain oil and other liquids from the same which can be accomplished by suitable machines well known in the art.

If a maximum recovery of oil from the fish is desired, oil can be drained from the cans as an intermediate step in the cooking operation in addition to effecting drainage after the cans leave the cooker. Thus, as shown in Fig. 1c, a transfer disc 98 is provided, which cooperates with one of the intermediate shelves of unit C, say a shelf located about half way down the corresponding drum 18. Suitable guide means 99 serves to divert or shunt cans carried by this particular shelf upon one side of disc 98, and from this disc the cans are successively delivered to a machine 101, which serves to invert the cans and thus drain oil and liquid from the same. From machine 101 the cans after drainage are redelivered to the other side of disc 98, from which they are again transferred back into the cooking chamber upon the same shelf of unit C. Disc 98 is of course driven at a suitable rate, in synchronism with the rotation of unit C. Drainage of the cans as an intermediate step may be dispensed with, where it is desired to produce canned sardines having a relatively high food value by virtue of the amount of fish oil retained.

The manner in which fish are cooked by the above described apparatus, can be explained by reference to Fig. 12. In this figure we have indicated an open can 34 containing fish, which is disposed between two superposed shelves 19 as a normal operation of the apparatus. As has been previously explained, the walls of drum 18 are heated to a relatively high temperature by the gaseous products of combustion flowing through the drums and by radiation from conduit 73, and heat from the walls of this drum is conductively transferred to the metal shelves 19. These shelves therefore from heated surfaces, one of which is disposed adjacent to and directly above the open can 34, and the other of which serves to support and therefore is in direct conductive contact with the lower surface of the can. The one shelf therefore cooperates in the cooking operation by directly conducting heat to the contents of the can, while the other heated surface formed by the shelf directly above the can, which also serves as a support for the cans of the next succeeding level, serves to radiate heat to the exposed surfaces of the fish. With respect to the use of radiant heat as a substantial factor in effecting cooking of the fish, the present method is claimed generically in Peebles Patent No. 1,677,364. However, in addition to the use of radiant heat as a substantial factor in the cooking of the fish, the present method also utilizes heat directly conducted to the cans and its contents from the shelf supporting the same, and also by heat from the heated gaseous atmosphere in the space surrounding drums 18. This method of cooking can be described as being a grilling or broiling action. The final product is more nutritious and palatable than fish cooked by prior methods, as for example by frying the fish in oil. Furthermore, the method serves to more effectively render the oil from the fish, thus making possible a maximum yield of valuable oil. It is also characteristic of the method that the skin of the fish becomes set during the first part of the cooking period, so that the skin of the final product is not mutilated. In this connection it should be noted that the humidity of the gaseous atmosphere surrounding the drums 18 should be maintained between certain limits, dependent upon the condition of the fish as they enter the cooker, to prevent breakage or mutilation of the skin of the fish during a cooking operation. With our apparatus, humidity can be readily controlled between adequate limits, by controlling the speed of operation of blower 78. In connection with cooking by our method, it may be noted that we prefer to pack the fish within the cans prior to their introduction into the apparatus, with the dark backs of the fish uppermost. This positioning of the fish permits the cavities of the individual fish to drain more readily, and the dark exposed surfaces more readily absorb radiant heat. Furthermore, when the fish are removed from the cans, after the lids on the cans have been cut away, the contents of the fish can be inverted upon a plate with the light surfaces uppermost, thus presenting an attractive appearance.

To briefly review the operation of the complete apparatus, open top cans packed with fish to be cooked are continuually delivered one behind the other to the uppermost shelf or unit A. Upon being delivered to the uppermost shelf of this unit, the cans are carried about in the arc of a circle and are then transferred by transfer unit AB to the uppermost shelf of unit B. After traveling through the arc of a circle about the axis of unit B, they are delivered by transfer unit BC to the uppermost shelf of unit C. Unit C also carries the cans about the arc of a circle and reverses their direction towards unit B. After being delivered by transfer device CB the cans are returned to the uppermost shelf of unit B, and by transfer means BA they are delivered to the second shelf of unit A. Thus the cans are successively transferred between the shelves of units A, B and C and are caused to pass back and forth over successively lower paths. During these movements of the cans, the fish are being cooked as has been previously described. At the end of the cooking operation the cans are delivered to conveyor 97, drained of their liquid contents, and then sealed.

It is evident that the invention can be modified in many ways within the spirit of the present invention. For example if it is desired to construct a cooking apparatus having greater capacity, a greater amount of shelving can be employed or more than three units carrying shelving can be provided. Likewise if the capacity of the apparatus need not be so great, less than three of the rotating units carrying shelving can be employed. It is also evident that certain refinements can be made to facilitate maintenance of the apparatus in proper working condition, or to facilitate repairs. For example the side walls 11 of the structure 10 can be provided with doors 106 to provide ready access into the cooking chamber. Furthermore suitable signal or alarm means can be employed to indicate improper operation of certain of the moving parts, as for example to indicate a falling of a can of fish from one of the castings 36 following jamming of the cans.

We claim:

1. In a cooker of the character described, a plurality of rotatable units carrying shelving for supporting articles to be cooked, and means serving to transfer said articles from the shelving of one unit to the shelving on the other, said means comprising a plurality of structures, each structure being formed to provide a slide extending between two shelves and being supported at its ends by said two shelves.

2. In a cooker of the character described, a plurality of rotatable units carrying shelving for supporting articles to be cooked, and means serving to transfer said articles from the shelving of one unit to the shelving on the other, said means comprising a plurality of seperate structures, each structure formed to provide a slide extending between two shelves, and means for supporting and retaining said structures whereby said structures are caused to individually aline themselves to cooperate with said shelves.

3. In a cooker of the character described, a plurality of rotatable units carrying shelving for supporting articles to be cooked, and means serving to transfer said articles from the shelving of one unit to the shelving on the other, said means comprising a plurality of separate structures, each structure formed to provide a slide extending between two shelves, means for retaining said structures whereby individual alining movements of said structures is permitted, each structure being formed to provide a curved slide extending between two shelves, and means for effecting automatic and individual alinement of said structures.

4. In a cooker of the character described, a plurality of drums rotatable about spaced vertical axes, circumferential shelves mounted upon the outer periphery of said drums and adapted to support articles to be cooked, and means serving to transfer articles from the shelving of one drum to the shelving on the other, said means comprising a plurality of separately removable structures, each structure formed to provide a slide extending between two shelves.

5. In a cooker of the character described, a plurality of drums rotatable about spaced vertical axes, circumferential shelving mounted upon the outer periphery of said drums and adapted to support articles to be cooked, and means serving to transfer said articles from the shelving of one drum to the shelving on the other, said means comprising a plurality of structures, each structure being formed to provide a slide extending between two shelves and being supported at its ends by said two shelves, and means serving to retain said structures without restricting individual alining movements thereof.

6. In a cooker of the character described, a plurality of drums rotatable about spaced vertical axes, circumferential shelving mounted upon the outer peripheries of said drums and adapted to support articles to be cooked, and means serving to transfer said articles from the shelving of one unit to the shelving on the other, and to retransfer said articles from the shelving of the other unit back to the shelving of the first, said means comprising two groups of superposed structures, each structure being formed to provide a slide extending between two shelves, and means for loosely connecting the structures of one group with the structures of the other.

7. In a cooker of the character described, a plurality of drums rotatable about spaced vertical axes, circumferential shelving mounted upon the outer peripheries of said drums and adapted to support articles to be cooked, and means serving to transfer said articles from the shelving of one drum to the shelving on the other, and to retransfer said articles from the shelving of the other drum back to the shelving of the first drum, said means comprising two groups of superposed structures, each structure formed to provide a slide extending between two shelves, and means serving to loosely interlock the structures of one group with the structures of the other.

8. In a cooker of the character described, a plurality of drums rotatable about spaced vertical axes, circumferential shelving mounted upon the outer peripheries of said drums and adapted to support articles to be cooked, and means serving to transfer said articles from the shelving of one drum to the shelving on the other, and to retransfer said articles from the shelving of the other drum back to the shelving of the first, said means comprising two groups of separate superposed structures, each structure being formed to provide a slide extending between two shelves, and being supported at its ends by said two shelves, and means for loosely retaining said structures in general assembled relationship.

9. In a cooker of the character described, a plurality of drums rotatable about spaced vertical axes, circumferential shelving mounted upon the outer peripheries of said drums and adapted to support articles to be cooked, and means serving to transfer articles from the shelving of one drum to the shelving on the other, and to retransfer said articles from the shelving of the other drum back to the shelving of the first, said means comprising two groups of separate superposed structures, each structure being formed to provide a slide extending between two shelves, and being supported at its ends by said two shelves, means for loosely interlocking the structures of one group with the structures of the other, and means for loosely retaining said structures in general assembled relationship.

10. In a cooker of the character described, a cooking chamber having top and bottom walls, a metal drum disposed within said chamber and rotatable about a vertical axis, the upper end of said drum being closed and the lower end being open and spaced from the bottom wall of the chamber, a conduit of relatively smaller diameter than the drum and extending concentric therewith, the upper end of said conduit being open to the interior of the drum and spaced from the inner surface of the top of the drum, the lower end of said conduit extending thru said bottom wall of the cooking chamber, means for introducing hot gas upwardly thru said conduit, means for removing gas from said chamber whereby gas introduced upwardly thru said conduit is caused to flow downwardly thru the space between the conduit and the inner side walls of the drum and into said chamber thru the space between the lower end of the drum and the bottom wall of the chamber, and shelving formed upon the outer periphery of the drum.

11. In a cooker of the character described, a cooking chamber having top and bottom walls, a metal drum disposed within said chamber and being rotatable about a vertical axis, the upper end of the drum being closed and the lower end thereof being open to the chamber and spaced from the bottom wall thereof, a conduit extending vertically within said drum and concentric therewith, said conduit being of relatively smaller diameter than the inner diameter of the drum and having its lower end opening thru said bottom wall of the chamber, heat insulating material disposed beneath the upper end of the drum, the upper end of the conduit terminating below the lower surface of said heat insulating material and being open to the interior of the drum, shelving mounted upon the outer periphery of the drum, and means for circulating hot gas upwardly thru the conduit, downwardly between the conduit and the inner walls of the drum, and into the cooking chamber thru the space between the lower end of the drum and the bottom wall of the chamber.

DAVID D. PEEBLES.
PAUL D. V. MANNING.
ALFRED H. POTBURY.